3,565,828
HYDRATED SILVER ALUMINATE CATALYST
John F. Kucirka, Northampton, Pa., assignor to Air Products and Chemicals Inc., Philadelphia, Pa., a corporation of Delaware
No Drawing. Continuation-in-part of application Ser. No. 699,027, Jan. 19, 1968. This application July 11, 1969, Ser. No. 841,691
Int. Cl. B01j 11/06
U.S. Cl. 252—463
5 Claims

ABSTRACT OF THE DISCLOSURE

A catalyst composition, conveniently designated as silver aluminate monohydrate, functions as a catalyst for the synthesis of ethylene oxide from oxygen and ethylene. The catalyst had 65±5% silver, a pore volume of 0.6 to 1.5 cc./g., and a surface area of 100–600 m.²/g. The catalyst is so active that acceptable conversions are obtained below 192° C., the critical temperature of ethylene oxide.

CROSS REFERENCE TO RELATED APPLICATION

This application is a continuation-in-part of application Ser. No. 699,027, filed Jan. 19, 1968 (now U.S. Pat. No. 3,472,787) which application is deemed here reiterated.

BACKGROUND OF THE INVENTION

Catalyst compositions comprising silver in a matrix have long been used as catalysts for the oxidation of organic compounds. Silicon carbide, minerals such as calcium carbonate, and silica have been utilized as supports for silver catalyst. Completely dehydrated alpha alumina, sometimes called corundum, has been a preferred support for silver catalyst for the oxidation of ethylene to ethylene oxide. As explained in Ameen 3,305,492, prior technologists have proven that generally high surface area, sorptive aluminas are quite unsuitable as supports for silver for ethylene oxide synthesis. It has been the general practice to use from about 1% silver to about 20% silver in a catalyst for ethylene oxide synthesis.

Compositions comprising silver may exist in the metallic silver state, or in the silver oxide condition, or as mixtures thereof, partly because the reaction between oxygen and silver is reversible throughout a significant temperature range, and partly because there is a strong propensity for silver oxide to decompose at least partially to oxygen and metallic silver at relatively low temperatures. In overcoming the inherent ambiguity due to equilibria involving Ag and Ag₂O and to the possibility of the existence of mixtures, it is advantageous to describe a catalyst composition by its weight percent of silver. A catalyst containing a fixed amount of silver will thus have about 7% less silver when in the oxide than in the metallic form. If the catalyst comprises mixtures of silver oxide and silver and/or the catalyst is to be used under conditions at which equilibria between the two forms might exist, then a range of about ±4% of the silver content is appropriate for designating such fixed amount of silver.

SUMMARY OF THE INVENTION

In accordance with the present invention, the catalyst composition can be called a silver aluminate catalyst having a silver content of from 60% to 70% by weight of the catalyst, having surface area above 100 m.²/g., but less than m.²/g., having a pore volume within a range from about 0.6 to about 1.5 cc./g., having hydrate water from about 0.8 to about 1.2 (i.e. approximately 1) mol of water per mol of alumina, and having a unit atomic ratio of silver ion (metallic or oxide form) to aluminum ion of the magnitude from about 0.8 to 1.2 (i.e. approximately 1). The catalyst composition is conveniently designated as a silver aluminate corresponding to the empirical formula:

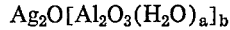

in which each of $a$ and $b$ is independently approximately 1 and within a range from 0.8 to 1.2, said catalyst containing by weight 65±5% silver, said catalyst having a pore volume of 0.6–1.5 cc./g., said catalyst having a surface area greater than 100 m.²/g.

A preferred method of preparing the catalyst features mixing of reactants to prepare a substantially stoichiometric silver aluminate co-gel, digesting the mixture at an elevated temperature, and purifying the separated solids to prepare a dry gel having the designated properties. Primary emphasis is upon attaining an extremely uniform distribution of silver in the alumina, such uniformity being enhanced by also achieving the Ag/Al unit ratio close to 1. It is recognized that variations in the H₂O/Al₂O₃ unit ratio may arise in part from relative humidity, conditions of use of the catalyst, and the like but the catalyst properties are enhanced by the unit ratio close to 1.

DESCRIPTION OF THE PREFERRED EMBODIMENTS

The catalyst composition features a weight concentration of silver of 65±5%, having a high degree of uniformity of silver distribution throughout an alumina matrix. One method of achieving such uniformity is by co-gel preparation, preferably by metathatical reaction assuring a Ag/Al unit mol ratio close to 1.

The invention is further clarified by reference to a plurality of examples.

EXAMPLE I

A catalyst featuring an alumina matrix and silver and/or silver oxide catalytic sites was manufactured in such a manner as to achieve high surface area and high uniformity of microstructure. An acidic solution was prepared having a concentration of about 0.19 molar silver nitrate, and consisting of 323 g. of silver nitrate (1.9 mols) dissolved to provide 10 liters of solution. Similarly a solution having a basic reaction was prepared by dissolving 323.4 g. (2.1 mols) of sodium aluminate tetrahydrate in water to provide 10 liters of 0.21 molar sodium meta aluminate. The acidic solution and the basic solution were each pumped through a heat exchanger to cool each solution to 2° C. Each stream was contained in a tube having a circular cross-section. At the end of each tube, a stream entered the mixing zone through an orifice having a diameter of very small dimension, thereby helping to minimize concentration gradients in the mixing zone. Moreover, the small diameter of the stream at such orifice necessitated a high velocity of the stream. The two streams were pumped from the heat exchanger to a central portion of an inverted foraminous basket type of impeller of a disperserator type of high turbulence mixer. Each stream flowed continuously into the suction zone of the impeller at the rate of 26 liters per hour, so that the disperserator mixed the 20 liters of mixture in about 23 minutes. The power input in the zone of intense turbulence adjacent the impeller was significantly greater than the concentration of power in a zone of a mixer featuring paddles, propellors, or similar means for achieving conventional turbulence in a mixing zone, and the "intense turbulence" terminology is intended to distinguish the concentration of large amounts of power in a small mixing zone from conventional mixing zones. At the disperserator, the streams were mixed in proportions adapted to provide soluble sodium nitrate and insoluble silver aluminate and/or gelatinous mixture of silver oxide and aluminum oxide, the alumina being the matrix in which the silver ions were uniformly distributed. The control of the mixing was adapted to minimize gradients of concentration of ingredients and gradients of pH within the mixing zone.

A stream of intermediate product dispersion flowed readily from the disperserator to a digestion tank without back pressure so that the residence time in the mixing zone adjacent the impeller of the disperserator was relatively brief and less than one minute. The residence time in the digestion zone was relatively long, requiring time for the heat-up and time for the redistribution of colloidal charges and other transformations during digestion. Thus, residence time in the digestion zone was several times greater than in the mixing zone. In order to assure uniform temperature throughout the 20 liters of composition undergoing digestion, stirrers were employed, but the stirrers did not provide as much turbulence as provided for the zone in which the acidic and basic solutions were mixed. In the digestion tank, the initial reaction mixture was heated to a temperature of 100° C., whereby occluded soluble reaction products were shifted from the suspended particles to the solution (thereby imparting washability to the filter cake), and whereby the pH of the solution was lowered, and whereby the reaction was brought to completion, and whereby the colloidal charges were redistributed. If allowed to cool and settle, such digested mixture could form a lower layer of colloidal gelatinous particles dispersed as a more concentrated slurry and an upper decantable layer consisting essentially of an aqueous solution of sodium nitrate substantially free from gelatinous silver aluminate particles. Ordinarily it is desirable to proceed with other steps after hot digestion and the potential decantability after hot digestion is merely further clarification of the transformations achieved by hot digestion, evidencing the redistribution of colloidal charges on the gelatinous particles. No component was added or withdrawn during the elevated temperature digestion.

Separating the aqueous solution containing soluble reaction product salts from the heterogeneous composition to prepare a cake of reaction product was the significant step after the 100° C. digestion. The composition was filtered on a filter press having a plurality of filter pads in a plurality of 4-hole frames, and adapted to permit pressurized washing of the filter cake. After such removal of extraneous water, the filter cake was washed with 75 liters of deionized water. Thus, substantially all alkali metal compounds were removed from the filter cake. The intermediate product was washed with 20 liters of methanol, thus displacing substantially all of the water with methanol. The filter cake was then washed with 15 liters of ether, thereby removing substantially all of the methanol, and providing an etherate of the filter cake.

The filter cake etherate was transferred to a high-pressure apparatus, and the material was heated to about 250° C. at a pressure of about 75 atmospheres, thus being above the 194° C. critical temperature and at a pressure above the 35.5 atmospheres critical pressure of ethyl ether. Then the gas was released from the chamber at a rate such that the chamber was not cooled below the critical temperature of ethyl ether, and the release of the gas was continued until the chamber was at substantially atmospheric pressure. The apapratus was then cooled to room temperature, and the silver aluminate product was removed. Although the compositon had a very high surface area, it tended to be hydrophobic, easily wet by hydrocarbons, and difficultly wetted by water. The product had a very low bulk density, and was transformed into a product which could be handled more readily by compression of the powder into tablets using a tableting pressure of about 130 atmospheres. Said tablets were catalyst tablets featuring an alumina matrix and silver oxide catalyst sites.

The catalyst was tested for the preparation of ethylene oxide by the use of a reactor having a length to diameter unit ratio of 11.5, said reactor containing 0.191 g. of the silver oxide-alumina catalyst. The total space gas velocity corresponded to 71,000 volumes of gas per hour per volume of catalyst. The gas mixture consisted of 88% inert gas, 10% oxygen, and 2% ethylene. About one-half part per million by weight of ethylene dichloride was added to the ethylene stream. The gas mixture was passed through the catalyst bed at atmospheric pressure at 190° C. and there was a 30.4% conversion of the ethylene at a selectivity of 79.1% for conversion to ethylene oxide. Said conditions provided 1.04 kilograms of ethylene oxide per kilogram of catalyst per hour. Such results provide a larger amount of ethylene oxide per kilogram of catalyst per hour and a lower temperature of operation as well as more satisfactory selectivity than is typical of commercial production of ethylene oxide. Accordingly, the evidence indicates that said silver oxide-alumina catalyst is superior to some previously employed catalysts for the conversion of ethylene to ethylene oxide.

Such superior performance as a catalyst is believed to be attributable to the combination of the steps in the preparation of the catalytic material, and paricularly to the control of the conditions at which the insoluble material is prepared from the plurality of aqueous solutions, such conditions providing a product in which the silver ions are uniformly distributed throughout the alumina matrix. The prevention of gradients of pH and/or concentration during the formation of the insoluble product is believed to account for a significant portion of the superior activity. The possibility of conducting the reaction at the significantly lower temperature is believed to be attributable in part to the very high surface area of the silver-alumina catalyst, which surface area has a high degree of stability by reason of the rarity of the crystal defects or structural defects which have generally characterized high surface area composite materials and strong ionic character of the dispersed metal component. The initially prepared solid material is characterized not merely by a very high surface area, but also by a very low bulk density, giving it a large pore diameter. In the step of pelleting the low bulk density material into tablets, certain changes in the macro-structure occur but not in the micro-structure, and this does not interfere with the catalytic site availability attributable to the uniformity of the micro-structure of the material.

EXAMPLE II

A catalyst is prepared following the general procedure of Example I but controlling the proportions to aim at a precisely 1 ratio of Ag to Al atoms in the silver aluminate. The catalyst is effective in the synthesis of ethylene oxide from oxygen and ethylene, and is so active that ethylene oxide preparation is established at low temperatures below 250° C., far below the minimum activity temperature of some commercial catalysts for ethylene oxide synthesis.

EXAMPLE III

Several batches of a high surface area, silver aluminate catalyst were prepared by duplications of the procedure of Example II. Thus it was demonstrated that the content of the silver in the silver aluminate was sufficiently duplicative to justify the silver aluminate terminology. Moreover, each of the several catalysts thus prepared was shown to be highly effective in the preparation of ethylene oxide from a gaseous mixture comprising ethylene and oxygen. Data relating to certain preparations of ethylene oxide by the use of the hydrated silver aluminate catalyst are noted.

A gas stream consisting of 77% argon, 8% oxygen, and 5 mol percent ethylene was passed, together with ethylene dichloride accelerator at a concentration of the magnitude of 500 parts per billion of reaction stream, over the pelleted, hydrated silver aluminate catalyst to provide an effluent containing about 0.75% ethylene oxide, the selectivity being about 77 mol percent and 2.25 kilograms of ethylene oxide being produced per kilogram of catalyst.

A gas stream consisting essentially of 68% methane, 25% ethylene, 7% oxygen and about 0.5 p.p.m. of ethylene chloride accelerator was evaluated using various diluents for the catalyst, as indicated in the table.

| Run | A | B | C | D | E |
|---|---|---|---|---|---|
| Reactor diam., in | 0.25 | 0.175 | 0.25 | 0.175 | 0.175 |
| Reactor length, in | 1.5 | 11.5 | 12 | 12 | 12 |
| Diluent | None | $Al_2O_3$ | $Al_2O_3$ | (1) | (2) |
| Vol. cat./vol. dil | Inf. | 1/7 | 1/7 | 1/7 | 1/7 |
| KgEtO/kg. cat./hr | 0.24 | 0.04 | 0.23 | 2.52 | 3.25 |
| P.s.i.g | 110 | 100 | 100 | 100 | 100 |
| GHSV cat | 18,000 | 43,000 | 43,000 | 43,000 | 43,000 |
| Bath temp., °C | 195 | 175 | 200 | 200 | 190 |
| $C_2H_4O$ in effl., percent | 0.55 | 0.05 | 0.53 | 1.38 | 1.58 |
| Selectivity | 77.7 | 80.0 | 68 | 65 | 64 |

1 Al filings.
2 Al powder.

Inasmuch as the catalyst proved effective for ethylene oxide synthesis at temperatures (175–200° C. or 347–392° F.) significantly lower than conventional for industrial production of ethylene oxide, the data indicated that the catalyst had high activity and an advantageous combination of activity, selectivity, and stability for ethylene oxide synthesis.

By a series of tests it is established that the silver content must be 65±5% by weight, but that slight departures from the desired unit ratio of 1.0 are permissible so long as impurities (i.e. other than silver, alumina, and water) are excluded. Neither the Ag/Al unit ratio nor the $H_2O/Al_2O_3$ unit mol ratio should be outside the range from 0.8 to 1.2, and if either approaches a limit, then the other must be closer to unity, as required by the 65±5% silver requirement. Efforts should be made to attain a ratio of Ag/Al close to 1, but variations in the $H_2O/Al_2O_3$ are less significant and more nearly self-correcting during prolonged use of the catalyst at synthesis conditions. The ratio of $Ag_2O/Ag$ apparently varies without jeopardizing the operativeness of the catalyst composition for ethylene oxide synthesis. The surface area must be within the range from 100 to 600 m.²/g. and the pore volume must be from 0.6 to 1.5 cc./g.

Although there are variations of a preferred method of preparing the catalyst, such preferred method features a high pH aluminate solution, which is sent as a stream of very small cross section, together with a cold silver nitrate solution stream of small cross section at uniform rates into a mixing zone. Power-actuated members provide turbulence in the mixing zone, the residence time being less than one minute, and the concentration of silver aluminate product being less than 100 g./l. of reaction mixture. The cold mixture is heated to above 80° C. to provide a composition which, upon cooling, provides a supernatant solution and a lower layer of more concentrated slurry of gelatinous particles of silver aluminate. A filter cake is provided from the digestion mixture, and sodium nitrate is washed therefrom to provide a hydrated silver aluminate filter cake. Water is removed from the filter cake to achieve the approximately 1/1 ratio of water to alumina. A preferred method of drying the purified silver aluminate filter cake is by washing with alcohol, then with ether and then removing the ether above the critical temperature and pressure of the ether.

EXAMPLE IV

A batch of 10 liters containing 323 g. (1.9 mols) of silver nitrate and 6.3 g. (0.1 mol) of nitric acid in water and a batch of 10 liters containing 282.6 (1.9 mols) of sodium aluminate tetrahydrate in water are each cooled to 2° C. and pumped through a tube having an internal diameter of about 500 microns into a mixing zone of a disperserator type of high turbulence mixer. Each stream flows continuously into the suction zone of an impeller at the rate of 26 liters per hour, whereby the 20 liters are mixed during about 23 minutes. The residence time of the composition in the turbulence mixing zone is only a few seconds, the effluent stream flowing to a 30-liter crock. The 20 liters of product contain about 317 g. of silver aluminate co-gel in a dilute solution of sodium nitrate. The concentrations of the silver aluminate suspended as gelatinous particles are about 15.9 g./l. or about 0.095 molar, and thus well below 100 g./l. (established as an upper limit).

The reaction mixture is heated to 99° C., maintained at that temperature for 15 minutes of digesting, and then transferred to a filter and washed with hot water until the filtrate has low conductivity. The filter cake is dispersed in 3 liters of dioxane and the slurry is distilled in drying apparatus in which dry dioxane is added to the slurry at the same rate at which distillate is removed. The wet, gelatinous silver aluminate is dried from about 18 to about 1 mol of hydrate water by co-distillation with dioxane. The hydrated silver aluminate is filtered from the dry dioxane and the residual solvent removed by heating at about 150° C. at a pressure of about 0.01 atmosphere, that is, under vacuum. The thus prepared $Ag_2O \cdot Al_2O_3 \cdot H_2O$ is pulverized and shown to retain its advantageous properties during weeks of storage in glass bottles at ambient conditions.

EXAMPLE V

The catalyst of Example IV is useful in slurry form, that is, the pulverized catalyst dispersed in a liquid.

An apparatus designed for operation at about 80 atmospheres (about 1180 p.s.i.g.) is equipped to permit withdrawal and injection of liquid from a pool of liquid in a reaction chamber, and the bubbling of gas through the pool of liquid, purification of the gas recycle stream to remove byproducts such as carbon dioxide, water, and the like, recirculation of a mixture of the purified recycle gas stream and feed stock, and injection of such mixture for bubbling through the pool of liquid. In start-up, the pool of liquid in the reactor is pure ethylene oxide, and the circulating gas is pure ethylene and the apparatus is pressurized and brought to operating temperature of 180° C., adequately below the 192° C. critical temperature of ethylene oxide. The pressure is well above the critical pressure of ethylene oxide. A slurry of hydrated silver aluminate in ethylene oxide of Example IV is injected into the pool, and the overflow ethylene oxide is withdrawn for purification. Pure oxygen is introduced into the circulating ethylene stream and the temperature of the slurry of silver aluminate and ethylene oxide is maintained at 180°. The ethylene and oxygen react at 180° C. in the presence of the silver aluminate catalyst to form ethylene oxide. The extremely high activity of the silver aluminate catalyst permits ethylene oxide synthesis below the critical temperature of the ethylene oxide. Thereby the ethylene oxide product is withdrawable as a liquid, thus greatly simplifying the purification apparatus and procedures. The oxygen concentration is maintained at about 5% of the mixture of ethylene and oxygen, and the conversion of oxygen per pass is about 60%. The liquid ethylene oxide is withdrawn from the pool of slurry of catalyst at a rate of about 3 kg. of ethylene oxide per kg. of catalyst per hour.

EXAMPLE VI

The catalyst of Example IV is pelleted to provide cylindrical granules having a bulk density within the range from 500 to 1000 grams per 1,000 cc. Such range is established as the effective bulk density range for silver aluminate monohydrate pellets having a surface area of 100 to 600 m.²/g. The catalyst is tested in a gas flow reactor using a gas mixture of the type of Example I at a pressure of about 1180 p.s.i.g., and it is found that ethylene oxide is synthesized over this silver aluminate catalyst at bath temperatures of 180±10° C., thus further showing the remarkable activity of the catalyst in achieving ethylene oxide synthesis below the 192° C. critical temperature of ethylene oxide.

EXAMPLE VII

Filter cake is dried by co-distillation with dioxane and hot vacuum removal of the residual dry dioxane, as in Example IV, to provide a sorptive silver aluminate monohydrate. The pore volume of the product is about 1.1 cc. per gram. The silver aluminate monohydrate is ball-milled to approximately 3 micron average particle size and pelleted to provide pellets having sufficient mechanical strength for use in fixed beds. The pellets have a pore volume of 0.4 cc. per gram, some of the porosity having been lost by the compression of pelletting. The pellets have a bulk density of about 600 g./1000 cc., and thus are within a range from 500 to 1000 g./1000 cc. established as limits. Such range is found to be necessary for meeting industrial requirements for supported silver catalyst pellets. The surface area is within the range from 100 m.²/g. to 600 m.²/g., the established limits. The silver content is within the range from 60% to 70% by weight, the established limits.

The pellets are employed in preparing ethylene oxide at about 8 atmospheres at conditions resembling those of Example II, and the high activity of the catalyst permits synthesis at temperatures below 200° C. Careful control of the process permits synthesis of ethylene oxide at temperatures at high as 400° C., but the relative superiority of the catalyst is more outstanding in the lower temperature range.

Variations are possible without departing from the scope of the claims.

I claim:

1. A hydrated silver aluminate catalyst having 65±5% silver, a surface area greater than 100 m.²/g. and less than 600 m.²/g., a pore volume from 0.6 to 1.5 g./cc., and indicated by the formula $Ag_2O[Al_2O_3(H_2O)_a]_b$ in which each of $a$ and $b$ is independently approximately one and within a range from about 0.8 to 1.2

2. A catalyst of claim 1 in which each of $a$ and $b$ is about 1 and the silver content is about 62%.

3. A pelleted catalyst of claim 1 in which the surface area is more than 200 m.²/g., the pellets having a bulk density of from about 500 to 1,000 grams per 1,000 cc.

4. The method of preparing a silver aluminate catalyst of claim 1, which preparation includes the steps of:
   (a) preparing a solution of precisely regulated concentration of sodium aluminate in water;
   (b) preparing a solution of precisely regulated concentration of silver nitrate in water;
   (c) providing a mixing zone in which power-actuated members provide turbulence;
   (d) continuously directing at high velocity and at a temperature below about 25° C. reactant streams of the sodium aluminate and silver nitrate solutions, said streams being of very small cross-sectional dimension, to the mixing zone, the flow rates of the solutions providing proportions of nitrate which are from 100% to 120% of the stoichiometric equivalent of the sodium ion, the continuous streams being supplied to the turbulent mixing zone at uniform rates assuring freedom from gradients of concentration and freedom from gradients of pH in the mixing zone, said streams reacting to form a reaction product dispersed in a reaction mixture, there being ready flow of the reaction mixture from the mixing zone without back pressure, the residence time of the streams of reactants in the turbulent mixing zone being less than one minute, and the concentration of each component being such that the concentration of the silver aluminate product is less than 100 g./l. of reaction mixture;
   (e) transferring the reaction mixture withdrawn from the turbulent mixing zone to a digestion zone, and heating the reaction mixture to a temperature above 80° C. while providing less turbulence to the digestion zone than in the mixing zone, no component being added or withdrawn from the system during digestion, the residence time in the digestion zone being several times greater than the residence time in the turbulent mixing zone, said digestion bringing about the formation of a pH lower than that of the initial reaction mixture, said digestion promoting the completion of the reaction to transform the digested mixture into a heterogeneous composition of insoluble silver aluminate particles in an aqueous system, said digestion promoting the transformation into particles forming a filter cake capable of being washed for removing substantially all soluble, alkali metal ion compounds therefrom, said digested mixture being a dispersion of gelatinous particles of silver aluminate of sufficient size that upon cooling and standing, a supernatant solution of byproduct can be separated by decantation from a lower layer of more concentrated slurry of gelatinous particles;
   (f) removing extraneous water from the digestion mixture to provide a filter cake having a characteristic of being washable to remove substantially all soluble alkali metals ions compounds therefrom;
   (g) preparing from such filter cake a dried gel having a bulk density less than 2 g./ml. and a surface area greater than 100 cm.²/g., said dried gel consisting essentially of hydrated silver aluminate.

5. The method of claim 4 in which the filter cake is treated by steps including:
   (h) washing the filter cake with at least one solvent selected from the group comprising water, lower alkanols, and lower alkyl ethers; and
   (i) heating the filter cake under pressure above the critical temperature of the organic solvent and venting the organic solvent at an elevated temperature above the critical temperature thereof to provide a dried gel.

References Cited

UNITED STATES PATENTS

| | | | |
|---|---|---|---|
| 2,578,841 | 12/1951 | Robertson et al. | 260—348.5 |
| 2,773,844 | 12/1956 | Carlson et al. | 252—463 |
| 3,420,784 | 1/1969 | Keith et al. | 252—463X |

DANIEL E. WYMAN, Primary Examiner

C. F. DEES, Assistant Examiner

U.S. Cl. X.R.

252—476; 260—348.5

FO-1050
(5/69)

UNITED STATES PATENT OFFICE
CERTIFICATE OF CORRECTION

Patent No. 3,565,828          Dated February 23, 1971

Inventor(s) John F. Kucirka

It is certified that error appears in the above-identified patent and that said Letters Patent are hereby corrected as shown below:

Column 1, line 67 after "than" insert --600--

Column 3, line 65, "apapratus" should read --apparatus--

Column 6, line 4 "turbulence" should read --turbulent--

Column 7, line 30 after "temperatures" "at" should read --as

Column 8, line 41 "100 cm$^2$/g" should read --100 m$^2$/g--

Signed and sealed this 25th day of April 1972.

(SEAL)
Attest:

EDWARD M. FLETCHER, JR.          ROBERT GOTTSCHALK
Attesting Officer                    Commissioner of Paten